No. 838,801. PATENTED DEC. 18, 1906.
G. S. NEELEY.
METHOD OF REGULATING THE FIELD DENSITY OF ELECTRIC GENERATORS.
APPLICATION FILED AUG. 21, 1905.

2 SHEETS—SHEET 1.

Witnesses:
G. A. Pennington
B. F. Funk

Inventor:
George S. Neeley,
by Bakewell Cornwell
Attys.

UNITED STATES PATENT OFFICE.

GEORGE S. NEELEY, OF ST. LOUIS, MISSOURI.

METHOD OF REGULATING THE FIELD DENSITY OF ELECTRIC GENERATORS.

No. 838,801.

Specification of Letters Patent.

Patented Dec. 18, 1906.

Application filed August 21, 1905. Serial No. 275,068.

*To all whom it may concern:*

Be it known that I, GEORGE S. NEELEY, a citizen of the United States, residing at the city of St. Louis, State of Missouri, have invented a certain new and useful Improvement in Methods of Regulating the Field Density of Electric Generators, of which the following is a full, clear, and exact description, such as will enable others skilled in the art to which it appertains to make and use the same, reference being had to the accompanying drawings, forming part of this specification, in which—

Figure 1:
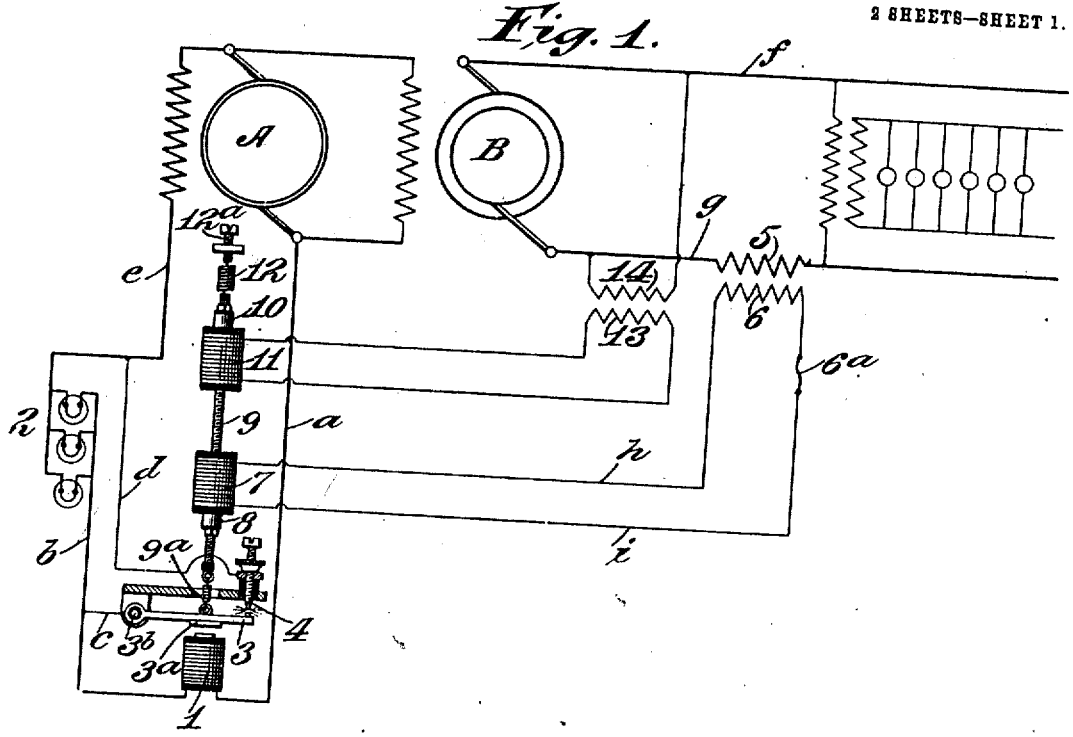
Figure 2:
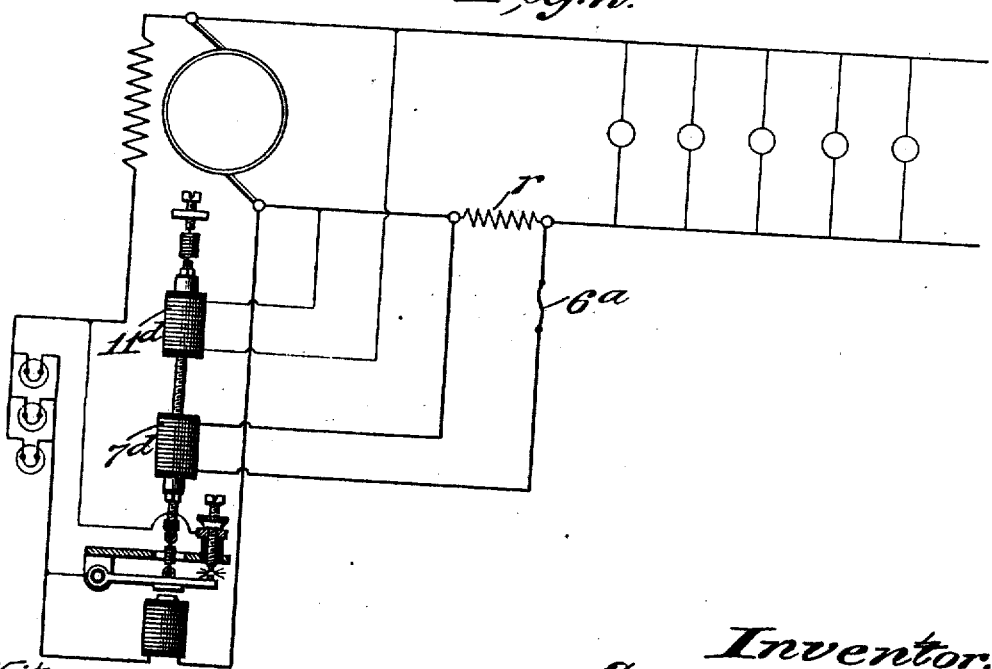
Figure 3:
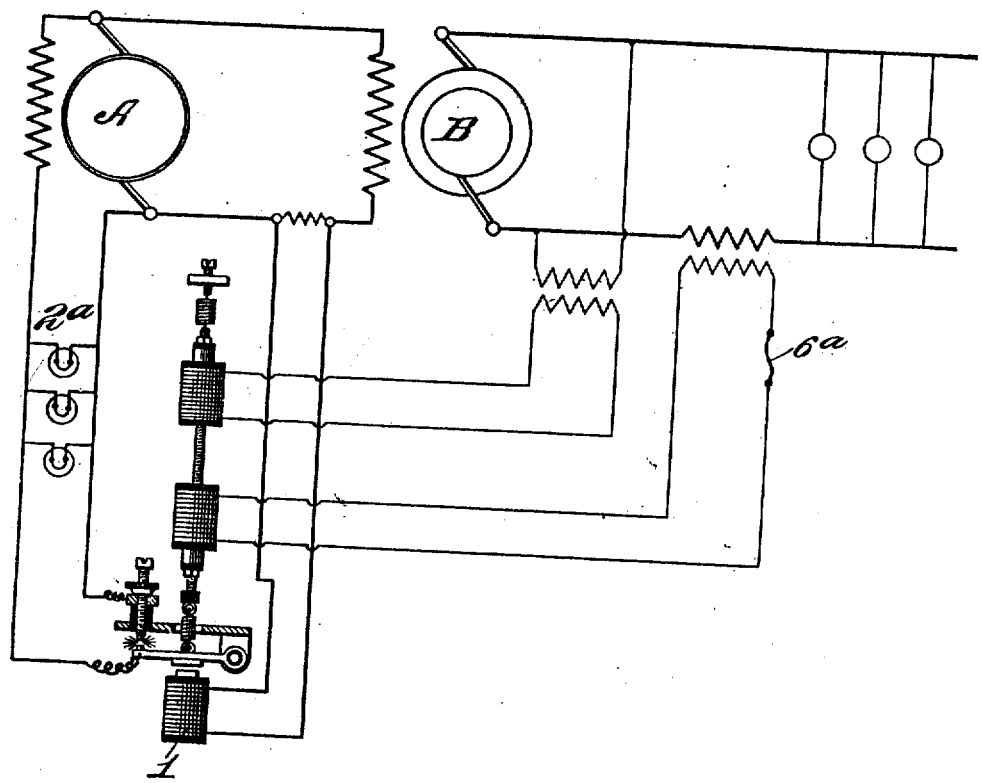

Figure 1 is a diagrammatic view illustrating my improved method of regulating the field density of a separately-excited generator, one of the primary artificial magnets being incorporated into the field-circuit of the exciter and the other in the working circuit of the main generator, respectively. Fig. 2 is a diagrammatic view illustrating my improved method operating in connection with a self-exciting generator; and Fig. 3 is a diagrammatic view illustrating my improved method used in connection with a separately-excited generator, one of the primary artificial magnets being incorporated into the working circuit and the other in the field-circuit of the generator.

This invention relates to a new and useful method for automatically regulating the field density of electric generators, the object disclosed in the present apparatus being to maintain a constant voltage in the work circuit or system by a simple arrangement for magnetically operating the field resistance and by a minimum expenditure of energy.

In the drawings I have shown an apparatus for carrying my invention into practice, the same consisting of a variable resistance in the field-circuit of the generator in one instance and in the field of the exciter in the other instance, which is primarily operated by two artificial magnets. One of these artificial magnets is controlled entirely by the variation of the intensity of the current supplied to the work circuit or system or such part of it as it may be found necessary to use. The other artificial magnet is controlled by the intensity of the shunt-field exciting-current when regulating the field density of a self-exciting dynamo or by the exciter field-current if regulating the field density of a separately-excited dynamo and is arranged in opposition to the first-mentioned artificial magnet. The advantages of having these artificial magnets controlled from these sources are many, among which may be mentioned the fact that there is no extra current consumed by the artificial magnets, the regular current supplied to the system being made to do one-half the work of operating the field resistance, the other artificial magnet doing the other half of the work through energy derived from the regular shunt-field-exciting current of either the working dynamo or its exciter. Thus means are provided for operating two powerful artificial magnets which are energized from sources of power that vary in equal ratios and will result in a positive change in the field resistance at the correct instant to prevent voltage fluctuation and too without the consumption of extra energy from the system. I also provide a suitable shunt whose resistance is one wherein the temperature coefficient is negative, said resistance being preferably carbon, and also connect it in series with the shunt-field of the exciter or in series with the shunt-field of the working dynamo if self-exciting, whichever the case may be, and for convenience in connecting and disconnecting this shunt it is preferably in the form of a specialized type of incandescent lamp made up to suit special requirements. This shunt is capable of carrying about eighty per cent. of the shunt-field current when heated to a state of incandescence. By using this special carbon shunt it is found that there is a diminution of its retarding action as its temperature rises, which is a very desirable feature, as it serves to relieve the contacts which constitute the variable resistance as the load and voltage of the dynamo increase. Around this carbon shunt is maintained an electric arc the length of which is varied and controlled by the artificial magnets, one of which is in turn directly controlled by the intensity of the current supplied to the system and the other by the intensity of the current supplied to the shunt-field of the dynamo, or that of the exciter when connected to regulate the voltage of a separately-excited dynamo. I also make use of an elastic force, preferably the force of a spring, the force of which is added to the magnet controlled by the intensity of the current supplied to the system. This affords means for conveniently adjusting the regulator initially to any normal voltage. I also employ a third artificial magnet and energize it by the voltage of the current supplied to the system, whereby my regulator will automatically make compensation in the field resistance for decreased or increased speeds, thereby keeping the voltage of the dynamo and the system constant regardless of ordinary speed changes.

In the drawings (see Fig. 1) the exciter-field circuit passes through wire $a$ to an artificial magnet 1 and thence through wire $b$ in the one instance to the shunt 2, having a resistance whose temperature coefficient is negative, and in the other instance through wire $c$ to a movable contact 3, forming one terminal of a circuit about the shunt 2. This movable contact 3 carries an armature $3^a$, which is pivotally mounted at $3^b$ in a position to be attracted by the artificial magnet 1. Contact 3 preferably coöperates with a corresponding stationarily-mounted contact 4, from which leads a wire $d$ to the return-wire $e$ of the exciter-field circuit.

When the exciter is in operation, it will be obvious that the field density and current of the generator B will be regulated by the arc formed between the contacts 3 and 4, which constitutes a variable resistance, the increment in which will cause the current to flow through the shunt 2. Thus conjunctively the variable resistance and the resistance of the shunt 2 regulate the field density and current of the exciter A, and thereby directly control the field density and current of the generator B.

$g$ and $f$ indicate the main-line wires of the working circuit leading from and to the brushes of the generator B.

5 indicates the primary coil of a series or current transformer, from the terminals of the secondary winding 6 of which lead wires $h$ and $i$ to and from the coil of the artificial magnet 7, whose armature 8 is directly connected by a rod 9 to the movable contact 3.

An elastic connection, preferably in the form of a spring $9^a$, is interposed between the rod 9 and movable contact 3 for the purpose of absorbing the vibration of the rod due to the alternating effect produced by the artificial magnets 7 and 11 when my apparatus is used in an alternating-current system. This spring cushions the vibration of the armatures 8 and 10 and prevents the transmission of said vibrations to the movable contact 3. Spring $9^a$ is not absolutely necessary where my apparatus is used in a direct-current system.

The artificial magnet 7 is placed in opposition to the artificial magnet 1 and tends to close the circuit around the shunt 2 in opposition to the artificial magnet 1, which tends to keep said circuit open and increase the variable resistance, which variable resistance (as well as the resistance of the shunt 2) directly influence the strength of artificial magnet 1, as well as the current strength and density of the exciter-field.

Rod 9, which connects the armature 8 with the movable contact 3, extends through the artificial magnet 7 and carries at its opposite end an armature 10, arranged in an artificial magnet 11. A spring 12 is connected to rod 9 and its carried armature 10, its tension being initially adjusted by screw-eye $12^a$ and is exerted to close the contacts 3 and 4, assist the pull of the artificial magnet 7, and resist the counter magnetic action resulting from the force of the artificial magnet 11 and artificial magnet 1. This magnet 11 is energized by the voltage of the current supplied to the system and assists in making compensation in the field resistance when variations occur in the voltage resulting from fluctuations in the speed and also assists in the regulation of the movable contact 3 when the voltage is increased or decreased from natural causes—as, for instance when the current in the working circuit is increased or decreased. This artificial magnet 11, which heretofore I have referred to as a "third artificial magnet," is preferably in the circuit of the secondary winding 13, whose primary 14 is across the lighting or work system.

In operation the variable resistance in the form of an arc between the contacts 3 and 4 in the local field-circuit of the exciter around the shunt 2 is under the control of the relatively powerful artificial magnets 1 and 7. The artificial magnet 7 is energized by the full intensity of the current supplied to the system, or such part of it as it may be found necessary to use, the series or current transformer furnishing the means whereby any proportional part of the current of the working circuit may be utilized and also as a means for reducing the usual high voltage. The artificial magnet 1 is energized by the intensity of the shunt-field exciting-current and is mechanically and magnetically in opposition to the artificial magnet 7. Thus there is no current wasted by the magnets, as the regular current supplied to the system is made to do half the work of operating the field resistance, the other half being done by the artificial magnet 1 through energy derived from the regular shunt-field exciting-current. In this way, as stated before, the magnets are operated from sources of power that vary in a ratio that will change the field resistance at the correct instant to prevent voltage fluctuation. The third artificial magnet 11 is energized by the voltage supplied to the system and assists in automatically compensating for changes of speed, which keeps the voltage of the dynamo and the system constant regardless of ordinary speed changes.

If a load is thrown on the dynamo B, it will increase the intensity of the current flowing in the main-line wires $f$ and $g$ and the series-transformer coils 5 6. The intensity of this current increases the magnetic attraction of the artificial magnet 7 for its armature 8 proportional to the increased intensity of current in the lines $f$ and $g$. This results in moving the contact 3 closer to the contact 4 and reduces the resistance in the field-circuit of the exciter A, which results in an increased field density in the dynamo B. When the current of the working dynamo is increased, it results in a slightly-decreased voltage and the artificial magnet 11 by being weakened will offer less resistance to the spring 12, and consequently the spring 12 assists in moving the contact 3 toward the contact 4, because the tension of said spring is always constant after adjustment, and the force exerted by the artificial magnet 11 in an opposite direction depends upon the strength of the voltage of the work system. The actions of the spring 12 and the artificial magnet 11 are reversed when the dynamo is under full load and the load begins to be thrown off. In such event the force of the artificial magnet 11 becomes the stronger, due to the slightly-increasing voltage, and thus operates to assist the artificial magnet 1 in widening the arc between the contacts 3 and 4, increasing the resistance to the exciting-current to compensate for the decreased load. If the dynamo is under full load and normal voltage and some or all of the load is thrown off of the work-circuit, it will instantly result in the withdrawal of some or all of the force of the artificial magnet 7, thus allowing the force of the artificial magnet 1 to preponderate in the regulation of the contact 3, which causes the arc to be widened until the field-current of the exciter through the artificial magnet 1 finds a new point of magnetic equilibrium with the force of the artificial magnet 7 in the work-circuit of the dynamo B.

In case of total disability of the artificial magnets 7 and 11 the system will not be rendered inoperative, but only non-automatic. The apparatus may then be operated by manual adjustment of the spring 12 for each increase or decrease of the load on the dynamo B.

If the dynamo B and the exciter A be driven by the same motive force, my regulator will compensate for twenty-five-per-cent speed variation in the motive force as follows: If the speed and voltage of the dynamo B j regulated for a given normal, a decrease speed acts to decrease the voltage and al ducing the speed of the exciter. As the opp s ing forces of the artificial magnet 11 and he spring 12 are equal at normal voltage nd speed, a decrease of speed will decrease the voltage, and consequently the force of the artificial magnet 11 The spring 12 will then act automatically to pull the contact 3 toward the contact 4, thus reducing the resist nce in the field of the exciter as fast as the sp d falls off. If the speed exceeds the normal, it will also increase the voltage of the dynamo above normal, and consequently the extra force of the artificial magnet 11 will automatically move the contact 3 farther away from the contact 4. An increase in speed also increases the field-current of the exciter, which increases the strength of the artificial magnet 1 and results in an increase in the resistance by widening the distance between the contacts 3 and 4 in the field-circuit of the exciter A at an equal ratio with the increasing speed.

In Figs. 1 and 3 I have shown an alternating-current dynamo, this form of separately-excited generator being the most common one met with in practice, and in order to avoid bringing the usual high-voltage current into contact with the regulator parts I have shown a series transformer in the working circuit and a constant-potential transformer across the working circuit, it being understood in the art that these devices give a secondary current and voltage exactly proportional to the primary current; otherwise but for the danger from handling the high voltage the main line forming the working circuit might just as well pass around the artificial magnet 7 before being connected to the various translating devices. This is also true of the artificial magnet that receives its energy from the voltage of the working circuit.

In Fig. 2 I have shown my improved apparatus arranged in a system wherein the dynamo is self-exciting. In this form the operation is precisely the same as that hereinbefore described with reference to the separately-excited system, with the exception that the series transformer and the potential transformer are of course unnecessary, the series transformer being replaced by a resistance shunt (marked $r$ in the work-circuit) which shunts a current proportional to the current in the work-circuit through the artificial magnet $7^d$. The potential magnet $11^d$ is energized by the voltage of the work-circuit, it being connected across the main-line wires of the work-circuit.

$6^a$ is a fuse (or a magnetically-operated circuit-breaker) in the secondary circuit derived from the primary in series with the main line or work-circuit or in the shunt-circuit of the self-exciting system shown in Fig. 2. This fuse is designed to carry current up to the working capacity to which the apparatus is initially set, and should this fuse be blown the artificial magnet 7 would be thrown out of service. The force of the artificial magnet 1 being left undisturbed would then preponderate and increase the variable resistance by increasing the distance between the contacts 3 and 4, thus leaving the full resistance of the shunt 2 in the field-circuit of the exciter, which would effectively prevent the exciter field-current from rising above eighty per cent. of its minimum normal value.

I have not shown herein the mechanical details of construction of the improved apparatus used in connection with my improved method, as the same is illustrated and described in a pending application filed by me July 31, 1905, and serially numbered 271,980.

In Fig. 3 I have shown a system wherein the artificial magnet 1 is energized by current in the separately-excited field of generator B and the constant and variable resistance 2ª, located in the field-circuit of the exciter A. In other respects the system shown in Fig. 3 is similar to that illustrated and described with reference to Fig. 1.

It will be noticed that the magnets which I employ in my method of regulating the field densities of electric generators are energized by electric currents and are therefore artificial magnets of the electromagnetic variety. I wish to make this distinction, as permanent magnets would not respond to the conditions imposed upon them, as the actions of the magnets must vary with the variations of their energizing sources.

Having thus described my invention, what I claim, and desire to secure by Letters Patent, is—

1. The method of regulating the field density of an electric generator which consists in exciting the field of said generator, controlling said excitation in response to differential electromagnetic forces resulting from placing the intensity of the field-current of the generator in magnetic opposition to the intensity of the current output of said generator; substantially as described.

2. The method of regulating the field density of an electric generator, the field of which is energized by an exciter, which consists in regulating the field resistance of the exciter in response to differential electromagnetic forces resulting from placing the intensity of the field-current of the exciter in magnetic opposition to the intensity of the current output of said generator; substantially as described.

3. The method of regulating the field density of an electric generator which consists in exciting the field of said generator from an independent source of current in response to differential electromagnetic forces resulting from placing the intensity of the field-current derived from said independent source in magnetic opposition to the intensity of the current output of said generator; substantially as described.

4. The method of regulating the field density of an electric generator which consists in exciting the field of said generator, controlling said excitation in response to differential electromagnetic forces resulting from placing the intensity of the field-current of the generator in magnetic opposition to the intensity of the current output of said generator, the first-mentioned magnetic force being assisted by the voltage of the current output of the generator; substantially as described.

5. The method of regulating the field density of an electric generator, the field of which is energized by an exciter, which consists in regulating the field resistance of the exciter in response to differential electromagnetic forces resulting from placing the intensity of the field-current of the exciter in magnetic opposition to the intensity of the current output of said generator, the first-mentioned magnetic force being assisted by the voltage of the current output of the generator; substantially as described.

6. The method of regulating the field density of an electric generator which consists in exciting the field of said generator from an independent source of current in response to differential electromagnetic forces resulting from placing the intensity of the field-current derived from said independent source in magnetic opposition to the intensity of the current output of said generator; the first-mentioned magnetic force being assisted by the voltage of the current output of the generator; substantially as described.

7. A method of controlling the field density of an electric generator which consists in controlling the field resistance by differential magnetic forces obtained from opposing the intensity of the field-current of said generator to the intensity of the current output of said generator; substantially as described.

8. The method of controlling the field density of an electric generator which consists in controlling the resistance of an arc in the field-circuit of the generator, and providing a shunt for said arc having a negative temperature coefficient, said arc being controlled by the intensity of the field-current of the generator in magnetic opposition to the intensity of the current output of said generator; substantially as described.

9. The method of controlling the field density of a separately-excited electric generator which consists in controlling an arc in series with the separately-excited field by opposing magnetic forces resulting from the intensity of the exciter field-current and the intensity of the current output of the main generator; substantially as described.

10. The method of controlling the field density of an electric generator which consists in controlling the field resistance in response to by opposing magnetic forces resulting from the intensity of the field-current of the generator and the intensity of the current output of said generator, the first-mentioned magnetic force being assisted by the voltage of the current output of the generator; substantially as described.

11. The method of regulating the voltage of an electric generator, consisting in exciting the field of said generator and controlling the field excitation by differential forces resulting from opposing the magnetomotive force of the field-current to the magnetomotive force of the current output of said generator; substantially as described.

12. The method of regulating the voltage of an electric generator, consisting in exciting the field of said generator and controlling the field excitation by differential forces resulting from opposing the magnetomotive force of the field-current to the magnetomotive force of the current output of said generator, the magnetomotive force of the field-current being assisted by the voltage of the current output of the generator; substantially as described.

In testimony whereof I hereunto affix my signature, in the presence of two witnesses, this 14th day of August, 1905.

GEORGE S. NEELEY.

Witnesses:
F. R. CORNWALL,
GEORGE BAKEWELL.